United States Patent
Butlin, Jr. et al.

(10) Patent No.: US 8,720,972 B2
(45) Date of Patent: May 13, 2014

(54) MOVABLE VISOR OR SCREEN

(75) Inventors: Albert H. Butlin, Jr., Beverly Hills, MI (US); James G. Gobart, Rochester, MI (US)

(73) Assignee: GM Global Technology Operations PLLC, Detroit, MI (US)

( * ) Notice: Subject to any disclaimer, the term of this patent is extended or adjusted under 35 U.S.C. 154(b) by 473 days.

(21) Appl. No.: 13/010,839

(22) Filed: Jan. 21, 2011

(65) Prior Publication Data

US 2012/0186757 A1    Jul. 26, 2012

(51) Int. Cl.
    *B60J 7/00*    (2006.01)
(52) U.S. Cl.
    USPC .................. 296/138; 160/370.21; 160/370.23
(58) Field of Classification Search
    USPC ............. 160/370.21, 370.22, 370.23; 49/502;
                    296/97.1, 193.06, 202, 97.8, 214, 138,
                    296/140, 141, 97.9, 97.12, 97.13
    See application file for complete search history.

(56) References Cited

U.S. PATENT DOCUMENTS

| | | | | |
|---|---|---|---|---|
| 1,487,978 A * | 3/1924 | Gerds et al. | | 160/48 |
| 1,500,563 A * | 7/1924 | Howell | | 296/97.8 |
| 1,603,181 A * | 10/1926 | Aborn | | 160/88 |
| 1,970,886 A * | 8/1934 | Dowd | | 160/132 |
| 2,506,383 A * | 5/1950 | Powers | | 160/132 |
| 2,965,416 A * | 12/1960 | Dryden | | 296/97.8 |
| 3,063,715 A * | 11/1962 | Hooker et al. | | 473/77 |
| 3,768,115 A * | 10/1973 | Hoffmann et al. | | 16/2.1 |
| 4,836,263 A * | 6/1989 | Ament | | 160/68 |
| 4,986,592 A * | 1/1991 | Kaiser et al. | | 296/97.8 |
| 5,067,765 A * | 11/1991 | Frye et al. | | 296/97.8 |
| 5,417,467 A * | 5/1995 | Viertal et al. | | 296/152 |
| 5,588,672 A * | 12/1996 | Karlow et al. | | 280/730.2 |
| 6,536,829 B2 * | 3/2003 | Schlecht et al. | | 296/97.4 |
| 6,776,211 B2 * | 8/2004 | Schlecht et al. | | 160/370.22 |
| 2003/0070775 A1 * | 4/2003 | Li | | 160/370.22 |
| 2005/0145347 A1 * | 7/2005 | Dawson et al. | | 160/370.21 |
| 2008/0179024 A1 * | 7/2008 | Fichter et al. | | 160/370.22 |
| 2012/0145339 A1 * | 6/2012 | Mason | | 160/370.22 |
| 2012/0186757 A1 * | 7/2012 | Butlin et al. | | 160/370.21 |

* cited by examiner

*Primary Examiner* — Blair M. Johnson
(74) *Attorney, Agent, or Firm* — Quinn Law Group, PLLC

(57) ABSTRACT

A movable screen or visor for a window adjacent a trim liner includes a contour rod movable from a stowed position to a deployed position. The contour rod includes a forward end, an offset portion, and a rearward end opposite the forward end from the offset portion. The screen also includes a shade member operatively attached to the contour rod. The shade member is disposed within the trim liner when the contour rod is in the stowed position and is disposed outside of the trim liner in the deployed position. The shade member blocks a portion of the window when the contour rod is in the deployed position.

18 Claims, 4 Drawing Sheets

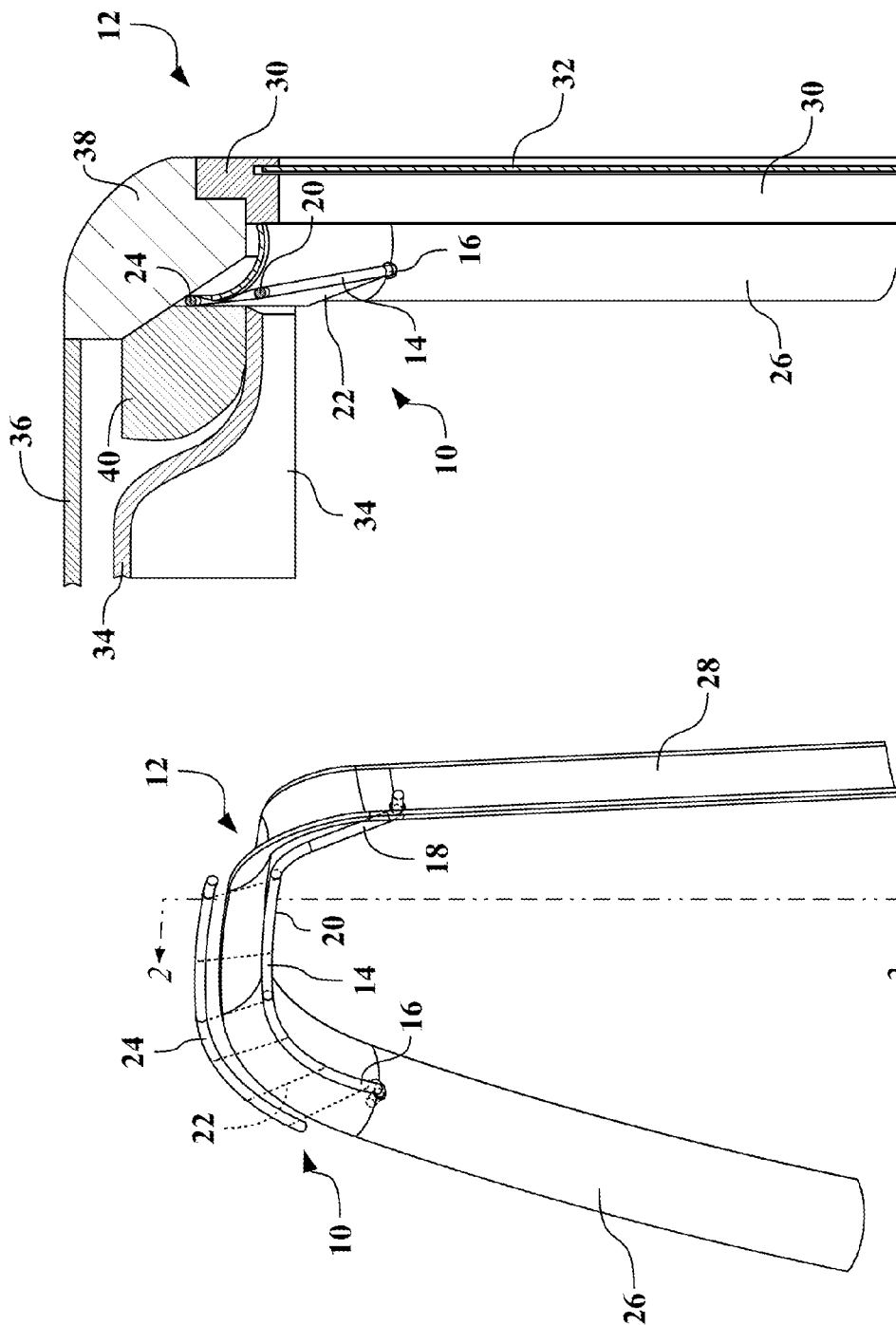

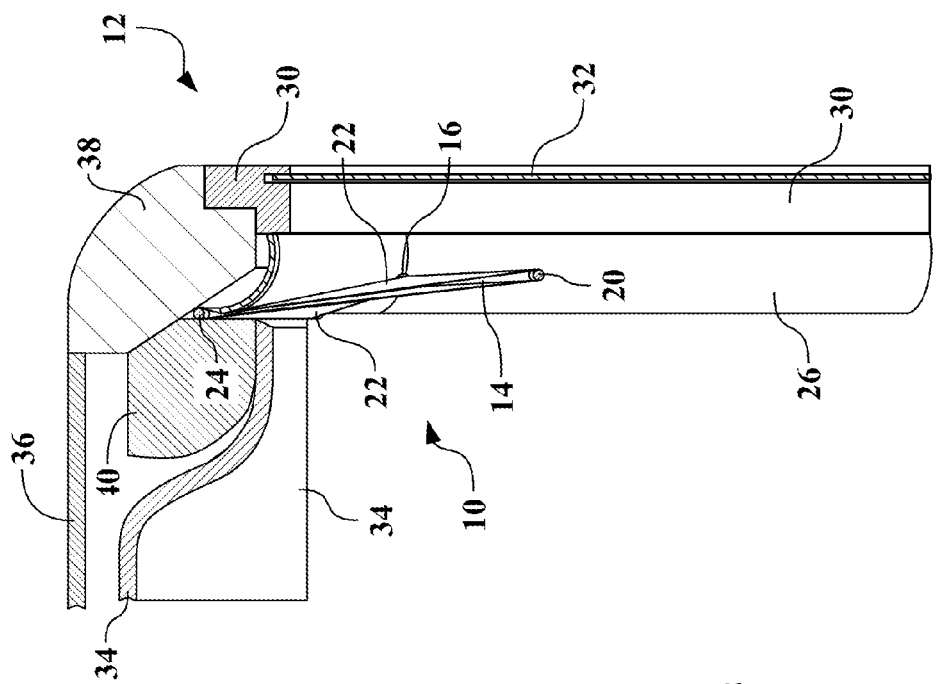
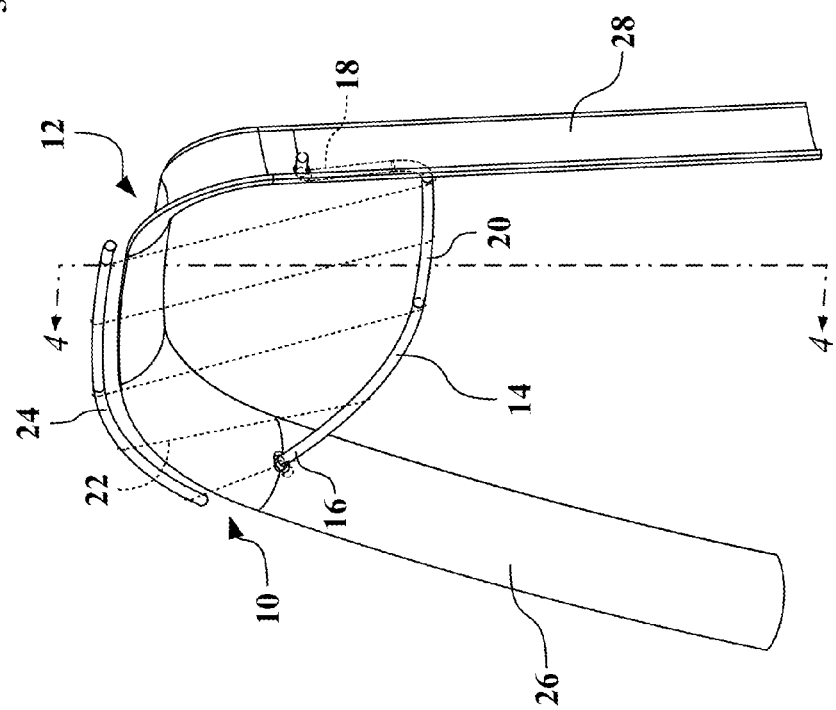

MOVABLE VISOR OR SCREEN

TECHNICAL FIELD

This disclosure relates to movable visors, screens, or sun visors for vehicles.

BACKGROUND

Vehicles may include one or more visors, which are surfaces that protect occupants by shading them from the sun or other bright light. Some visors can be lowered over part of the windshield (windscreen) by the driver or front passenger to block the sun, and some may be swung sideways to block sun entering the driver and passenger side windows.

SUMMARY

A movable screen or visor for a window adjacent a trim liner is provided. The screen includes a contour rod movable from a stowed position to a deployed position. The contour rod includes a forward end, an offset portion, and a rearward end. The forward end and the rearward end are on opposing sides of the offset portion. The screen also includes a shade member operatively attached to the contour rod. The shade member is disposed within the trim liner when the contour rod is in the stowed position and is disposed outside of the trim liner in the deployed position. The shade member blocks a portion of the window when the contour rod is in the deployed position.

Moving between the stowed position and the deployed position may include rotating the contour rod about the forward end and the rearward end. The screen may include an over-center feature proximate to one of the forward end and the rearward end. The over-center feature has a rocking point, and moving between the stowed position and the deployed position includes rotating the over-center feature past the rocking point.

The above features and advantages, and other features and advantages, of the present invention are readily apparent from the following detailed description of some of the best modes and other embodiments for carrying out the invention, as defined in the appended claims, when taken in connection with the accompanying drawings.

BRIEF DESCRIPTION OF THE DRAWINGS

FIG. 1 is a schematic isometric view of a visor system in a stowed position;

FIG. 2 is a schematic cross-sectional view taken along line 2-2 of the visor system shown in FIG. 1, and further schematically illustrating additional components of the vehicle associated with the visor system;

FIG. 3 is a schematic isometric view of the visor system of FIG. 1, shown in a deployed position;

FIG. 4 is a schematic cross-sectional view taken along line 4-4 of the visor system shown in FIG. 3, and further schematically illustrating additional components of the vehicle associated with the visor system;

DETAILED DESCRIPTION

Figure 5:
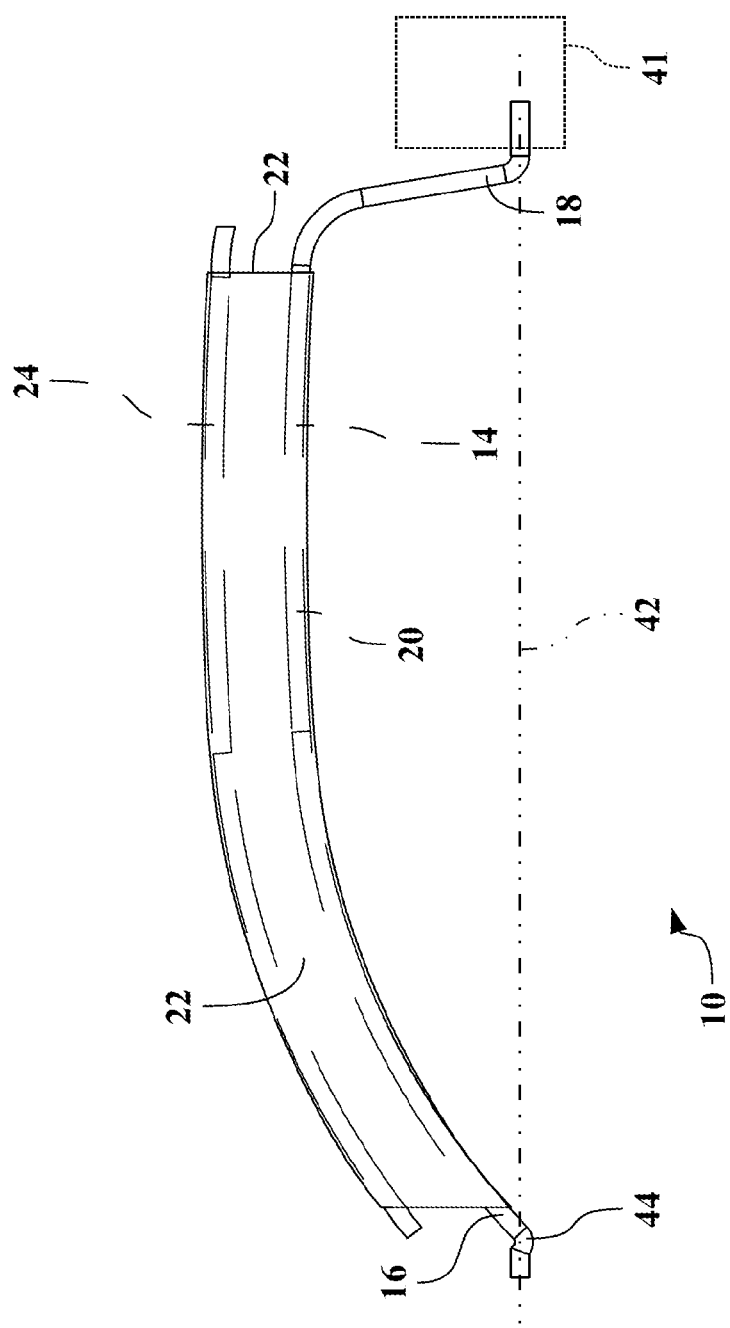
FIG. 5 is a schematic plan view of a visor system similar to that shown in FIGS. 1-4, shown in a stowed position with a semi-transparent shade member.

Referring to the drawings, wherein like reference numbers correspond to like or similar components whenever possible throughout the several figures, there is shown in FIG. 1 and in FIG. 2 schematic diagrams of movable screen or visor system 10. The visor system 10 is attached to a vehicle (not shown) and is operable to block or screen bright light, such as sunlight, from reaching the eyes of occupants of the vehicle. FIG. 1 shows an isometric view of the primary components of the visor system 10. FIG. 2 shows a cross-sectional view of the components of the visor system 10 shown in FIG. 1 taken along line 2-2, and also schematically illustrates additional components of the vehicle associated with or adjacent to the visor system 10.

While the present invention is described in detail with respect to automotive applications, those skilled in the art will recognize the broader applicability of the invention. Those having ordinary skill in the art will recognize that terms such as "above," "below," "upward," "downward," et cetera, are used descriptively of the figures, and do not represent limitations on the scope of the invention, as defined by the appended claims.

The visor system 10 is shown in FIG. 1 attached to a portion of a trim liner 12, which may be adjacent to a front, right door of the vehicle (as viewed from the interior of the vehicle). However, the visor system 10 may be attached adjacent to other doors and windows of the vehicle or, as discussed herein, may be attached directly to the door itself. The trim liner 12 refers generally to many pieces or components which form the structural, functional and cosmetic areas around the door.

The visor system 10 includes a contour rod 14, which is movable from a stowed position (as shown in FIGS. 1 and 2) to a deployed position (which is shown in FIGS. 3 and 4). The contour rod 14 has a forward end 16 and a rearward end 18 opposite the forward end 16 from an offset portion 20. Because the visor system 10 may be adjacent to any of the doors or non-door windows of the vehicle, the designation of "forward" and "rearward" is not limiting and is only used to better illustrate the configuration shown in FIGS. 1 and 2 (and also FIGS. 3 and 4). Portions of the contour rod 14 that are hidden from view by the trim liner 12 are shown in phantom lines.

The visor system 10 includes a shade member 22 that is operatively attached to the contour rod 14. A control rod 24 is disposed substantially within the trim liner 12. The shade member 22 spans between the contour rod 14 and the control rod 24 and is operatively attached to the control rod 24 along a first length or edge and to the contour rod 14 along a second length or edge.

For illustrative purposes, only the general location or path of the shade member 22 is shown in FIG. 1, and it is shown schematically with phantom lines. In FIG. 2, the shade member 22 is more-fully illustrated as a sleeve wrapped between the contour rod 14 and the control rod 24. Because the shade member 22 is very thin, no hatching is shown on the cross-sectioned plane of the shade member 22.

As shown in FIG. 1, the trim liner 12 includes an A-pillar 26 and a B-pillar 28. The forward end 16 of the contour rod 14 is operatively attached to the A-pillar 26 of the vehicle, and the rearward end 18 of the contour rod 14 is operatively attached to the B-pillar 28 of the vehicle. Depending upon the configuration of the visor system 10, the C-pillar may also support the contour rod 14, and the contour rod 14 may be flipped around such that the forward end 16 faces the rear of the vehicle.

As shown in FIG. 2, the trim liner 12 is adjacent to a door trim 30 and a window 32 of the vehicle. The trim liner 12 includes a headliner 34 and a roof panel 36, both of which are generally above the driver and occupants. A side header 38 may be an outer structural member for door and roof area. An airbag 40, such as a side curtain airbag, is located above the headliner 34 and is configured to deploy into the vehicle cabin when necessary. Many other components may be included in the trim liner 12 but are not shown, including seals to control water and dirt and wiring for the vehicle.

In the configuration of the visor system 10 shown in FIG. 2, the control rod 24 is disposed between the airbag 40 and the side header 38. However, the visor system 10 may also be configured for the control rod 24 to be disposed below the airbag 40. In either configuration, the visor system 10 does not interfere with deployment of the airbag 40.

Alternatively, the visor system 10 may be configured with the rearward end 18 and the forward end 16 of the contour rod 14 operatively attached to the door, such as at the door trim 30. The control rod 24 may also be disposed within, and hidden by, the door trim 30. In such a configuration, the contour rod 14 would move with the door when opened or closed.

The visor system 10 is shown in FIGS. 1 and 2 in a stowed position, but is also configured to move to the deployed position (as described herein and shown in FIGS. 3 and 4). As shown in FIGS. 1 and 2, the shade member 22 is disposed substantially within the trim liner 12 when the contour rod 14 is in the stowed position. Therefore, much of the visor system 10 may be hidden from view of the occupants of the vehicle in the stowed position.

The visor system 10 may be used in conjunction with additional visor systems 10 and may be used with additional types of visors (not shown) or screens. However, the visor system 10 may be configured to operate independently of other systems or structures for blocking light within the vehicle.

Referring now to FIG. 3 and to FIG. 4, and with continued reference to FIGS. 1-2, there are shown schematic diagrams of the visor system 10 in the deployed position. In order for the visor system 10 to better block sunlight from reaching the eyes of occupants of the vehicle, the contour rod 14 is moved from the stowed position to the deployed position. Similar to FIG. 1, FIG. 3 again shows an isometric view of the primary components of the visor system 10. Similar to FIG. 2, FIG. 4 again shows a cross-sectional view of the components of the visor system 10 shown in FIG. 3 taken along line 4-4, and also schematically illustrates the additional components. Much of the forward end 16 is blocked from view by the shade member 22 in FIG. 4.

Moving between the stowed position (shown in FIGS. 1 and 2) and the deployed position (shown in FIGS. 3 and 4) includes rotating the contour rod 14 about the forward end 16 and the rearward end 18. When in the deployed position, the shade member 22 is disposed outside of the trim liner 12 in the deployed position, such that the shade member 22 blocks a portion of the window when the contour rod 14 is in the deployed position.

For illustrative purposes, only the general location or path of the shade member 22 is shown in FIG. 3, and it is shown schematically with phantom lines. In FIG. 4, the shade member 22 is shown as a sleeve wrapped between the contour rod 14 and the control rod 24. Because the shade member 22 is very thin, no hatching is shown on the cross-sectioned plane of the shade member 22.

The shade member 22 may be an elastic fabric, which may facilitate retraction of the shade member 22 into the trim liner 12 when the contour rod 14 returns to the stowed position. Furthermore, the shade member 22 may be semi-transparent or translucent, such that only a portion of light striking the shade member 22 is blocked form passage. In some configurations, the shade member 22 may be shaped or tailored to the profile and distance between the contour rod 14 and the control rod 24. If the shade member 22 is tailored, the total amount of fabric used and the elasticity may be reduced.

Furthermore, the shade member 22 may serve to diffuse light entering the vehicle cabin. The shade member 22 may also be colored or painted to match the interior of the vehicle, the exterior of the vehicle, or both. In the figures, the shade member 22 is generally illustrated as having two sides or layers relative to the light source, such that the shade member 22 envelopes the contour rod 14 and the control rod 24. However, the shade member 22 may be use only a single layer to block and diffuse light.

The control rod 24 may be configured to be static, such that the control rod 24 is in substantially the same position when the contour rod 14 is in either the stowed position or the deployed position. Alternatively, the control rod 24 may be configured to roll or spin, such that some or all of the shade member 22 winds around the control rod 24 in the stowed position.

The contour rod 14 may be configured to move between the stowed position and the deployed position without assistance from actuators, such as a spring, a motorized actuator, or the like. However, the visor system 10 may include a motorized actuator 41 illustrated schematically in FIG. 5) configured to move the contour rod 14 from the stowed position to the deployed position, from the deployed position to the stowed position, or both.

Figure 6:
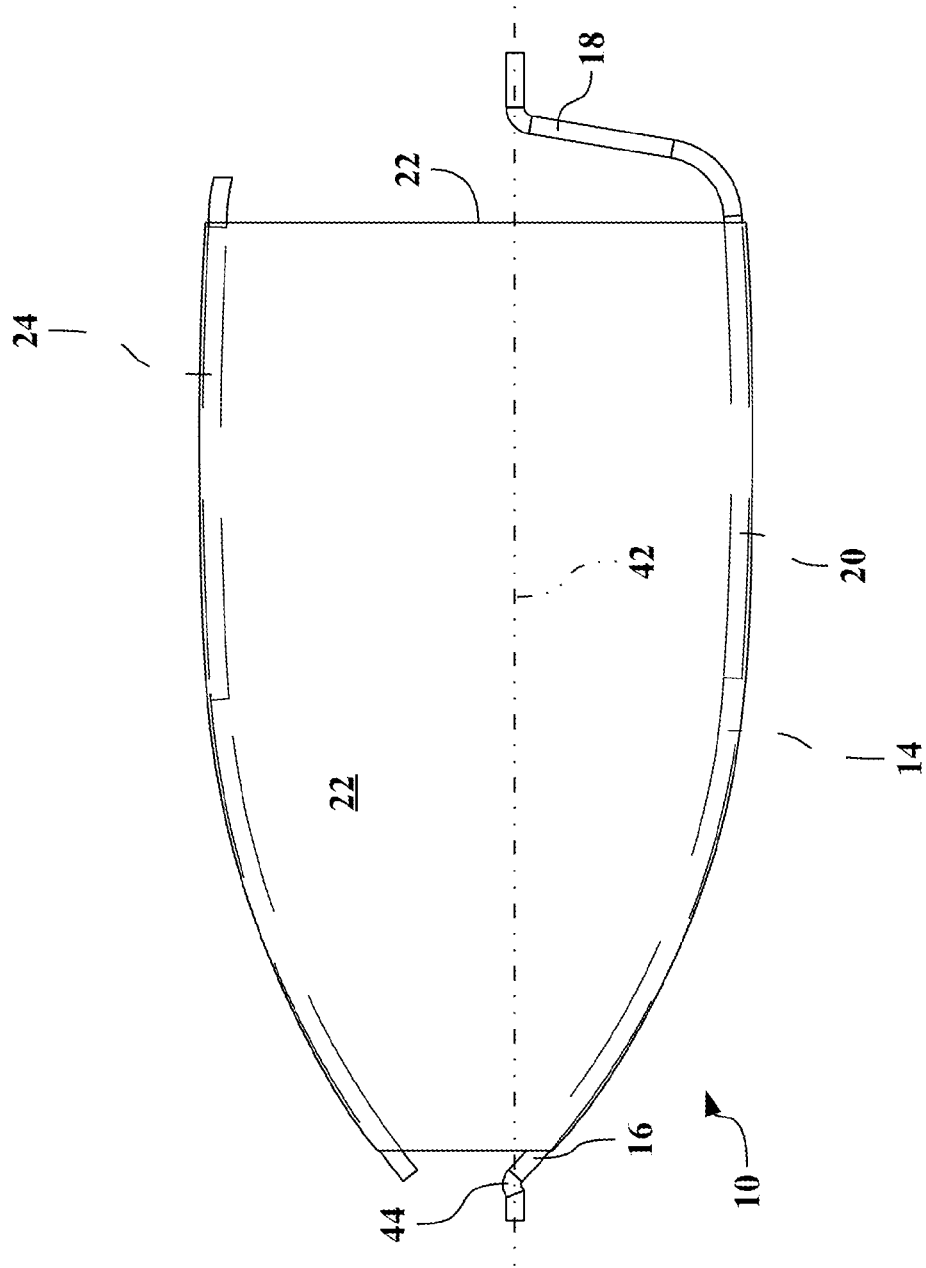
FIG. 6 is a schematic plan view of the visor system shown in FIG. 5, shown in a deployed position.

Referring now to FIG. 5 and to FIG. 6, and with continued reference to FIGS. 1-4, there are shown schematic diagrams of a portion of the visor system 10 in both the stowed position and the deployed position. FIG. 5 schematically shows the contour rod 14 and the shade member 22 in the stowed position, such that the shade member 22 is substantially disposed within the trim liner 12 (not shown in FIGS. 5 and 6). FIG. 6 schematically shows the contour rod 14 and the shade member 22 in the deployed position, such that the shade member 22 is stretched out between the control rod 24 and the contour rod 14 as is blocking a portion of the window 32. The shade member 22 is shown as semi-transparent in both FIGS. 5 and 6.

As shown in FIGS. 5 and 6, the rearward end 18 and the forward end 16 of the contour rod 14 are configured to rotate about a common axis 42. The visor system 10 also includes an over-center feature 44, which is proximate to one of the forward end 16, but may alternatively be proximate to the rearward end 18. The over-center feature 44 has a rocking point which is not coaxial with the common axis 42.

Therefore, moving the contour rod 14 between the stowed position and the deployed position includes rotating the over-center feature 44 past the rocking point. As the contour rod 14 moves away from the stowed position, the over-center feature 44 biases the contour rod 14 back toward the stowed position, such as by providing torque or resistance between the over-center feature 44 and an adjacent surface. However, once the contour rod 14 rotates sufficiently to move past the rocking point of the over-center feature 44, the contour rod 14 is biased toward the deployed position. A stop feature (not shown) may be attached, or built-in, to the trim liner 12 to assist in stopping rotation of the contour rod 14 in the deployed position.

A contact surface may be adjacent to the over-center feature 44 and may come into contact with the rocking point, causing reaction force, when the contour rod 14 is rotated. Alternatively, the common axis 42 may run through the over-center feature 44, such that rotation about the common axis 42 causes the far end of the forward end 16 to rock against some structure and provide reaction force as the contour rod 14 rotates between the stowed position and the deployed position. Many other types of over-center structures or configurations may be used to effect biasing of the contour rod 14 first toward the stowed position and then toward the deployed position.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A movable screen for a window adjacent a trim liner, comprising:
    a contour rod movable from a stowed position to a deployed position, and having:
        a forward end,
        a rearward end, and
        an offset portion between the forward end and the rearward end; and
    a shade member operatively attached to the contour rod, wherein the shade member is disposed within the trim liner when the contour rod is in the stowed position and is disposed outside of the trim liner in the deployed position, such that the shade member blocks a portion of the window when the contour rod is in the deployed position, and wherein moving between the stowed position and the deployed position includes rotating the contour rod about the forward end and the rearward end.

2. The screen of claim 1, further comprising an over-center feature proximate to one of the forward end and the rearward end, wherein the over-center feature has a rocking point and wherein moving between the stowed position and the deployed position includes rotating the over-center feature past the rocking point.

3. The screen of claim 2, further comprising a control rod disposed substantially within the trim liner, wherein the shade member is operatively attached to the control rod along a first length and to the contour rod along a second length.

4. The screen of claim 3, wherein the shade member is an elastic fabric.

5. The screen of claim 4, wherein the contour rod is configured to move between the stowed position and the deployed position without assistance from one of a spring and a motorized actuator.

6. The screen of claim 5, wherein the rearward end of the contour rod is operatively attached to a B-pillar of a vehicle.

7. The screen of claim 6, wherein the forward end of the contour rod is operatively attached to an A-pillar of the vehicle.

8. The screen of claim 7, wherein the control rod is disposed between a side curtain airbag and a header of the vehicle.

9. The screen of claim 8, wherein the control rod is configured to be static, such that the control rod is in substantially the same position when the contour rod is in the stowed position and the deployed position.

10. The screen of claim 9, wherein the rearward end and the forward end of the contour rod are configured to rotate about a common axis.

11. The screen of claim 10, wherein the shade member is translucent.

12. The screen of claim 4, further comprising a motorized actuator configured to move the contour rod from the stowed position to the deployed position.

13. The screen of claim 5, wherein the rearward end and the forward end of the contour rod are operatively attached to a door of a vehicle.

14. A movable screen for a window adjacent a trim liner, comprising:
    a contour rod movable from a stowed position to a deployed position, and having:
        a forward end,
        a rearward end, and
        an offset portion between the forward end and the rearward end;
        an over-center feature proximate to one of the forward end and the rearward end;
        wherein moving between the stowed position and the deployed position includes rotating the contour rod about the forward end and the rearward end; and
        wherein moving between the stowed position and the deployed position includes rotating the over-center feature past a rocking point;
    a control rod disposed substantially within the trim liner;
    a shade member operatively attached to the control rod along a first length and to the contour rod along a second length, wherein the shade member is disposed substantially within the trim liner when the contour rod is in the stowed position and is disposed substantially outside of the trim liner in the deployed position, such that the shade member blocks a portion of the window when the contour rod is in the deployed position.

15. The screen of claim 14, wherein the contour rod is configured to move between the stowed position and the deployed position without assistance from one of a spring and a motorized actuator.

16. The screen of claim 14, wherein the rearward end and the forward end of the contour rod are configured to rotate about a common axis.

17. The screen of claim 16, wherein the shade member is an elastic fabric, and is translucent.

18. The screen of claim 17, wherein the forward end of the contour rod is operatively attached to an A-pillar of the vehicle, and the rearward end of the contour rod is operatively attached to a B-pillar of a vehicle.

* * * * *